June 30, 1970  W. D. McALLISTER  3,517,976
BEARING LOCKING DEVICE
Filed Aug. 21, 1968  2 Sheets-Sheet 1

INVENTOR.
WILLIAM D. McALLISTER
BY
Eugene J Kalil
ATTORNEY

June 30, 1970     W. D. McALLISTER     3,517,976

BEARING LOCKING DEVICE

Filed Aug. 21, 1968     2 Sheets-Sheet 2

INVENTOR.
WILLIAM D. McALLISTER
BY
ATTORNEY

United States Patent Office 3,517,976
Patented June 30, 1970

3,517,976
BEARING LOCKING DEVICE
William D. McAllister, Poughkeepsie, N.Y., assignor to The Federal Bearings Co., Inc., Poughkeepsie, N.Y., a corporation of New York
Filed Aug. 21, 1968, Ser. No. 754,430
Int. Cl. F16c 35/06
U.S. Cl. 308—236                    8 Claims

ABSTRACT OF THE DISCLOSURE

An anti-friction bearing is disclosed having an inner ring for mounting on a shaft and a locking collar for securing the inner ring to the shaft. The inner ring has an axially extending arcuate portion which is adapted to project along the shaft, the locking collar being dimensioned to slip over the extending arcuate portion and the shaft, locking means being provided to fasten the collar to the extending arcuate portion and to bind said collar tightly against the shaft.

---

This invention relates to a locking collar for an anti-friction bearing and, in particular, to the combination of a locking collar and an anti-friction bearing wherein the collar securely locks the inner ring of the bearing to a supporting shaft.

Locking collars are known for securing hubs of wheels, pulleys, bearing races and the like to shafts by employing one or more set screws which pass through the locking collar into locking abutment with the shaft. This technique of fastening the collar to the shaft generally produces burrs on the shaft which interfere with the removal of the bearing therefrom. Inner bearing rings generally fit the shaft snugly and, therefore, burrs on the shaft should be avoided.

Another method is to use a self-locking collar in which the ring and the collar are locked to the shaft by a rolling rotation of eccentrically formed interfitting surfaces on the collar and on circumferential means extending axially from the inner ring. The eccentrically formed interfitting surfaces are in effect cams which cooperate with each other to effect binding of the inner ring to the shaft. For example, the inner ring extension may be formed with an eccentric bevel while the collar is formed with a lip having an eccentric surface which will mate with the bevel. The disadvantage of this combination is that extra machining operations are required to produce an eccentric bevel on the inner ring and, correspondingly, the coopearting lip on the collar. This combination is self-locking where the shaft rotation is in one direction. However, self-locking collars of the foregoing type cannot be used where the shaft is adapted to run in either a clockwise or counterclockwise direction. Moreover, most self-locking collars are held by set screws which cut into the shaft and form burrs.

It would thus be desirable to porvide a locking collar and inner ring combination which is simple in construction, which will provide positive locking of the inner ring to the shaft, and which locking effect is independent as to whether the shaft rotates in either a clockwise or counterclockwise direction.

It is thus an object of the invention to provide an improved means for locking or binding a bearing ring to a shaft.

It is another object to provide a simple locking collar construction capable of binding the inner ring of an anti-friction bearing to a shaft without using fastening means which cut into the shaft.

A a further object, the invention provides the combination of an anti-friction bearing having an inner ring mounted on a shaft and a locking collar which binds or locks the inner ring to the shaft while preventing axial displacement of said ring.

These and other objects will more clearly appear when taken in conjunction with the following disclosure and the accompanying drawings, wherein.

Stating it broadly, the invention is directed to an anti-friction bearing having an inner ring for mounting on a shaft and a locking collar for securing the inner ring to the shaft, wherein the inner ring has an extending arcuate portion for projecting along the shaft, wherein the collar is dimensioned to slip over both the extending arcuate portion and the shaft, and wherein the collar has locking means for fastening the collar to the extending arcuate portion and for clasping or binding the collar tightly against the shaft diametrically opposite the extending arcuate portion. By utilizing the foregoing combination, locking of the inner ring is established on said shaft and in a manner to resist axial displacement along the shaft.

Figure 1:
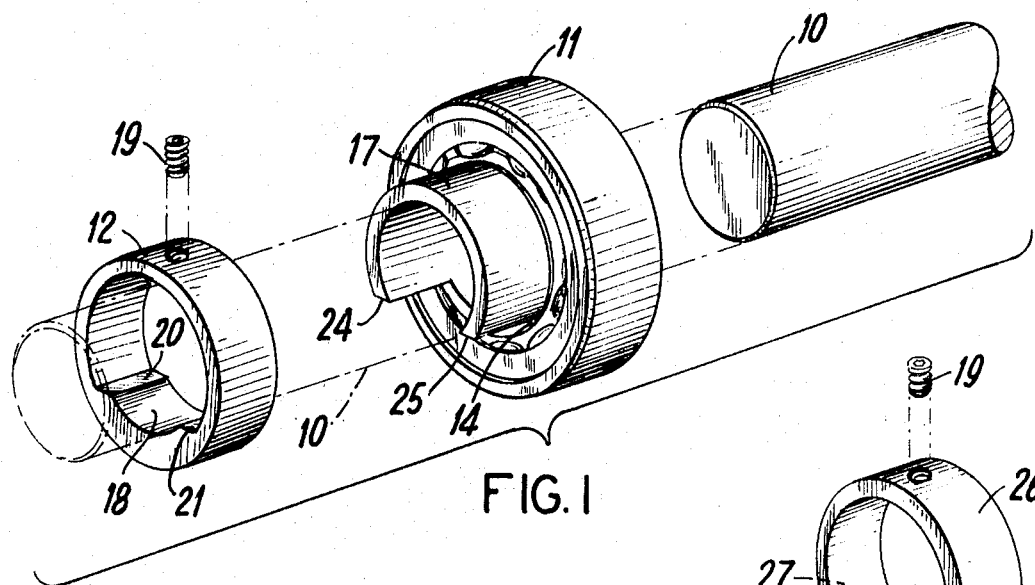
FIG. 1 shows in exploded perspective one embodiment of the invention, FIG. 2 being an end view of the bearing and collar combination, and FIG. 3 being a cross section of FIG. 2 taken along line 3—3.
Figure 2:
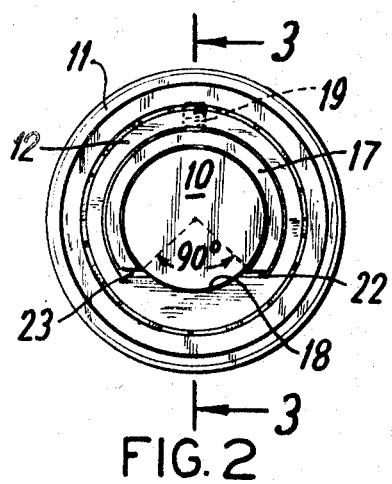
Figure 3:
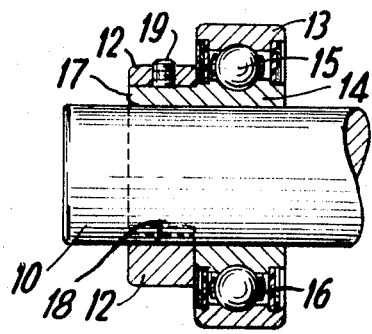

Referring to FIG. 1, one embodiment of the invention is shown in exploded perspective comprising broadly a shaft 10, an anti-friction bearing 11 and a locking collar 12. The details of the anti-friction bearing are shown in FIGS. 2 and 3 as comprising outer bearing ring 13 and inner bearing ring 14 with a complement of rolling elements 15 located between the races of said ring, said bearing elements being held in spaced-apart relationship by means of bearing cage 16. In FIGS. 1 and 3, inner ring 14 is shown with an axially extending arcuate portion 17, the ring has a cut out portion or slot diametrically opposite the extending arcuate portion adapted to receive locking collar 12 in telescoping association therewith, the locking collar having an internal arcuate chordal shoulder 18 which conforms in curvature to the shaft and is concentric therewith when the collar is locked against the shaft by means of set screw 19 which binds the collar against the top surface of axially extending arcuate portion 17. It will be noted that the arcuate shoulder is provided with lands 20 and 21 on each side thereof which are dimensioned to provide clearances 22 and 23 adjacent edges 24 and 25 of the extending arcuate portion, the clearance being provided to allow take-up on the collar during tightening. With the simple locking collar construction shown in FIG. 1, the locking collar is slip-fitted over both the shaft and extending arcuate portion 17 and then fastened at the arcuate portion by means of set screw 19 as shown in FIG. 3. Thus, at no time does the set screw cut into shaft 10. Depending upon the amount of force applied to the set screw, arcuate shoulder 18 is caused to bear tightly against and make surface contact with the shaft in a region diametrically opposite from the set screw as shown in FIG. 2. The shouldered collar may be produced by using a broaching operation.

Figure 1A:
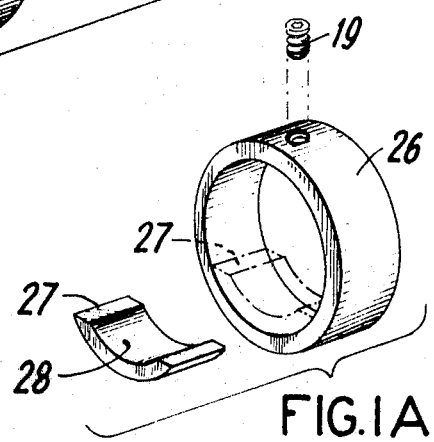
FIG. 1A is an exploded perspective of another embodiment of a locking collar, FIG. 2A being an end view of a bearing-locking collar combination utilizing the collar of FIG. 1A.

A modification of the locking collar of FIG. 1 is shown in FIG. 1A comprising a simple cylindrical ring 26 having associated therewith an insert 27, one face of which has an arcuate chordal shoulder 28 which conforms incurvature to that of shaft 10. The insert is placed on the inner surface of locking collar 26, as phantomly shown in FIG.

Figure 2A:
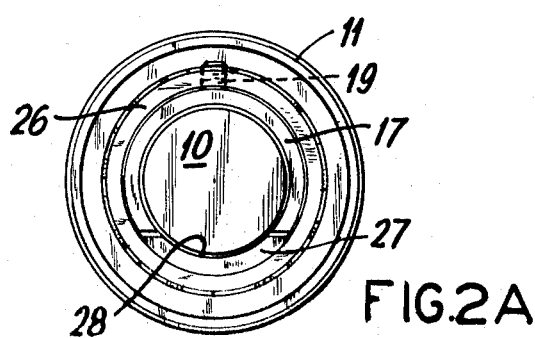

1A, which assembly is then telescoped over both the shaft and the axially extending arcuate portion 17 of inner ring 14 as shown in FIG. 2A. By exerting force on set screw 19, the slack in the locking collar is taken up and the locking collar tightly clasped against shaft 10 via arcuate shoulder 28 of the insert. An advantage of this type of locking collar is that broaching is not required to produce the arcuate insert. The locking collars shown in FIGS. 1, 1A and FIGS. 4 through 6 are dimensioned so as to provide several thousandths of an inch play to allow the collar to be easily slip-fitted over both the shaft and the axially extending arcuate portion of the inner ring. The portion cut out from the extended inner ring shown in FIG. 2 corresponds to about a 90° angle measured from the concentric center of the bearing. However, it need not be limited to this specific angle.

Figure 4:
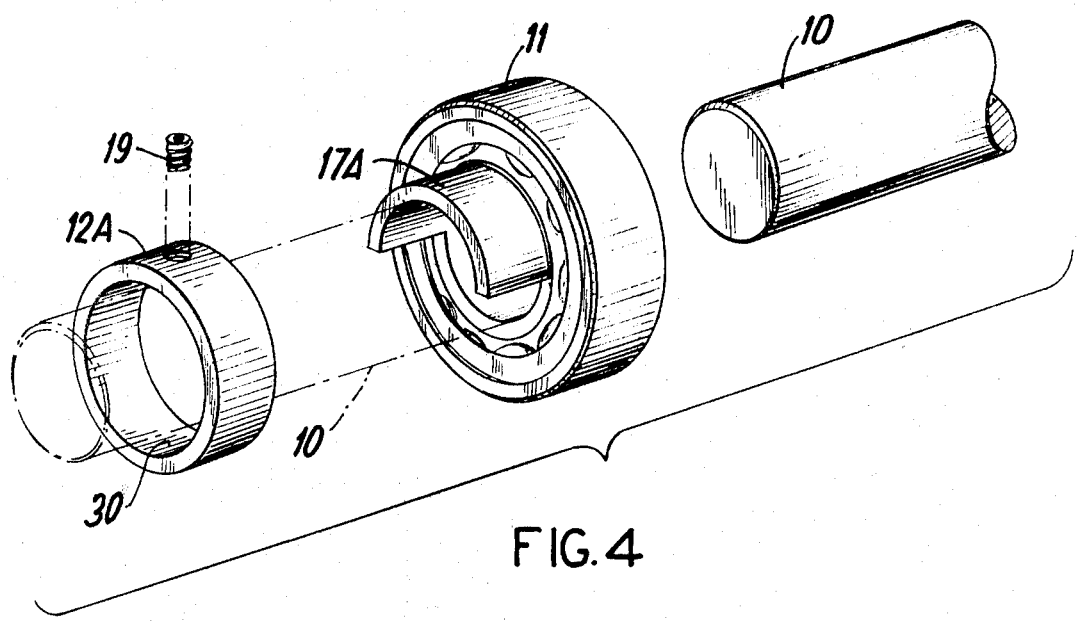
FIG. 4 is still another embodiment of the invention shown in exploded perspective, FIG. 5 being an end view of the combination of FIG. 4 as it appears mounted on a shaft and FIG. 6 being a cross section of FIG. 5 taken along line 6—6.
Figure 5:
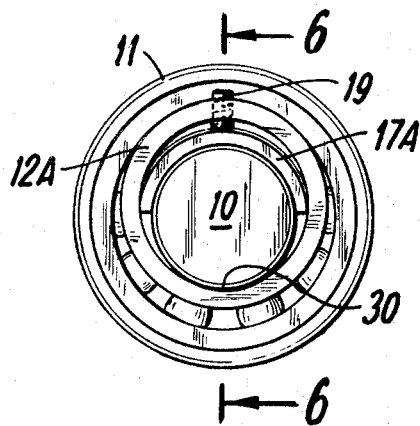
Figure 6:
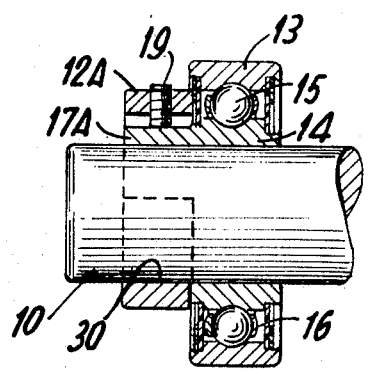

Referring now to the embodiment of FIGS. 4 through 6, the elements making up FIG. 4 comprise shaft 10, anti-friction bearing 11 and another form of a locking collar 12a. The inner ring has an axially extending arcuate portion 17a, the periphery of which spans approximately 180°. Referring to FIG. 6, the elements shown comprise outer ring 13, inner ring 14 with a complement of rolling elements 15 held therebetween by means of bearing cage 16. The locking collar 12a is constructed as a simple cylindrical ring which fits loosely over both shaft 10 and extending arcuate portion 17a. The locking collar is located in position as shown in FIG. 6 by driving set screw 19 against the surface of extending arcuate portion 17a thereby causing the bottom of the ring to lift up and bear against shaft 10 at 30. As will be noted from FIGS. 5 and 6, the set screw does not at any time contact the shaft, but is driven directly into the surface of extending arcuate portion 17a. Thus, the shaft is protected at all times from the fastening means or set screw.

As will be appreciated, various embodiments of the locking collar can be employed in carrying out the invention. For example, in the case of FIG. 1A, the insert there shown might have an extending keying member adapted to mate with a keying slot located internally of the locking collar 26 to minimize movement of the insert during use; or the insert could be cemented or otherwise mechanically attached to the collar.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In an anti-friction bearing having an inner ring for mounting on a shaft and a locking collar for securing said inner ring to the shaft, the improvement wherein said inner ring has an axially extending arcuate portion for projecting along a surface portion of said shaft, said inner ring having a slot opposite said extending arcuate portion, wherein said collar is dimensioned to slip over both said extending arcuate portion and said shaft, and wherein said collar has locking means for fastening said collar to the extending arcuate portion and for binding said collar tightly against the shaft at the slot portion diametrically opposite said extending arcuate portion, whereby to establish locking of the inner ring onto said shaft.

2. The anti-friction bearing of claim 1, wherein said locking collar is a ring of simple cylindrical shape and wherein said locking means is a set screw which passes through a threaded opening in said collar directly into the surface of said extending arcuate portion.

3. The anti-friction bearing of claim 1, wherein said locking collar has an internal arcuate chordal shoulder which conforms in curvature to said shaft and is concentric therewith, and wherein said shoulder abuts against said shaft at the slot portion when said collar is locked against said shaft by said locking means.

4. The anti-friction bearing of claim 1, wherein said locking collar includes an insert for use therewith, said insert providing an arcuate chordal shoulder which conforms in curvature to and is adapted to bear against said shaft at the slot portion diametrically opposite said locking means by virtue of the locking action of said locking means on said collar.

5. In an anti-friction bearing having an inner ring mounted on a shaft, the improvement wherein said inner ring has an axially extending arcuate portion which conforms substantially to the curvature of a surface portion of said shaft, said inner ring having a slot opposite said extending arcuate portion, wherein a locking collar is slip-fitted over both the shaft and said axially extending arcuate portion, and wherein said collar has locking means fastening said collar to and against said extending arcuate portion while clasping said collar tightly against the shaft at the slot portion dimetrically opposite said extending arcuate portion, whereby said inner ring is tightly locked onto said shaft against axial displacement.

6. The anti-friction bearing of claim 5, wherein said locking collar is a ring of simple cylindrical shape and wherein said locking means is a set screw which passes through a threaded opening in said collar directly in the surface of said extending arcuate portion and causing the bottom of said collar to bear against the shaft.

7. The anti-friction bearing of claim 5, wherein the inner periphery of said locking collar has an arcuate chordal shoulder which conforms in curvature to said shaft and concentrically abuts said shaft at the slot portion.

8. The anti-friction bearing of claim 5, wherein said locking collar includes an insert supported internally of said collar, said insert having an arcuate chordal shoulder which bears tightly against said shaft at the slot portion by virtue of the locking action of said locking means on said collar.

References Cited

UNITED STATES PATENTS

| 2,719,046 | 9/1955 | Frederick | 308—236 |
| 2,118,885 | 5/1938 | Hughes | 308—236 |

MARTIN P. SCHWADRON, Primary Examiner

F. SUSKO, Assistant Examiner